W. P. F. BEGGS.
Truck.
No. 71,685. Patented Dec. 3, 1867.
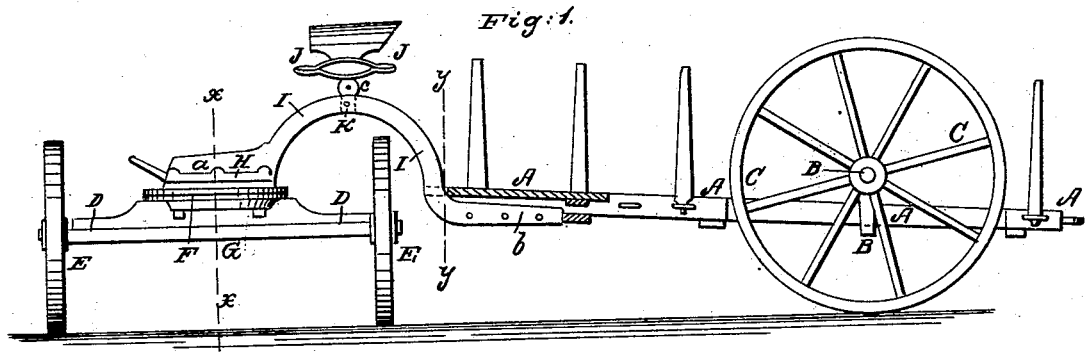
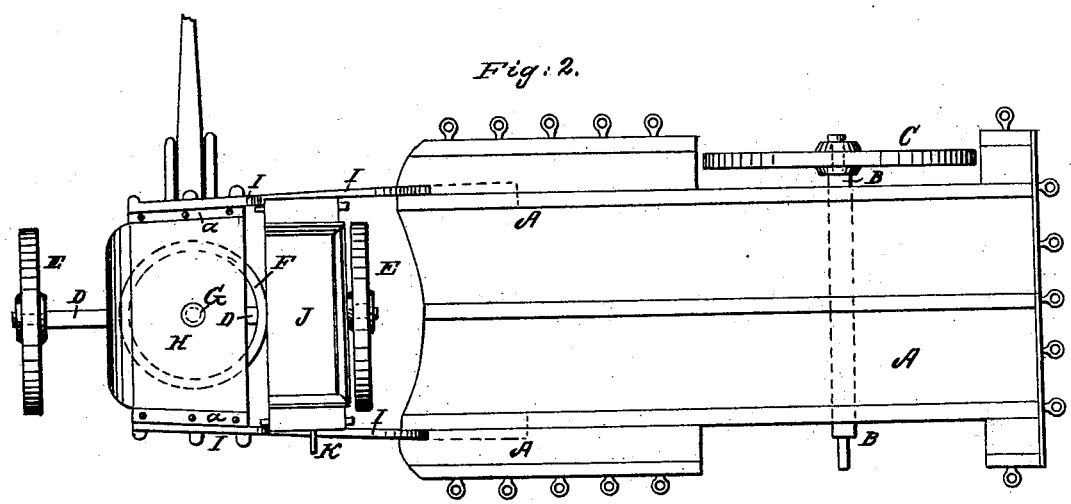
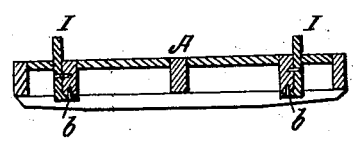
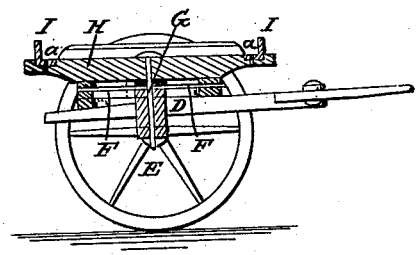
Witnesses:
Theo. Tusche.
Wm. Trewin.
Inventor:
W. P. F. Beggs.
Per Munn & Co.
Attorneys.

UNITED STATES PATENT OFFICE.

WILLIAM P. F. BEGGS, OF PHILADELPHIA, PENNSYLVANIA.

IMPROVEMENT IN TRUCKS.

Specification forming part of Letters Patent No. 71,685, dated December 3, 1867.

*To all whom it may concern:*

Be it known that I, WILLIAM P. F. BEGGS, of Philadelphia, in the county of Philadelphia and State of Pennsylvania, have invented a new and Improved Truck; and I do hereby declare that the following is a full, clear, and exact description thereof, which will enable others skilled in the art to make and use the same, reference being had to the accompanying drawings, forming part of this specification.

Figure 1 represents a side elevation, partly in section, of my invention. Fig. 2 is a plan or top view of the same. Fig. 3 is a vertical section of the same, taken in the line $x\ x$, Fig. 1. Fig. 4 is a detail vertical section of the same, taken on the line $y\ y$, Fig. 1.

Similar letters of reference indicate corresponding parts.

This invention relates to a new truck, which is so arranged that its front running-gear can be turned around the king-bolt, although its platform is quite low.

The invention consists in dividing the truck-platform into two parts, of which one forms the main platform, resting upon the rear axle, while the other part is secured upon the fifth-wheel, and holds the king-bolt in the ordinary manner. Both parts are connected by means of crane-neck-shaped bars or plates, which are bent high enough to allow the front wheels to be under them. Thus a slot is formed between the two parts of the platform, into which the front wheels are brought when a short turn is to be made. The driver's seat is arranged upon the upper part of the necks.

Heretofore low platform-trucks could not be obtained in combination with a front running-gear that could be turned at an angle of ninety or more degrees from its ordinary position, while when turning front gear is used a high platform was employed, which is very inconvenient for loading and unloading, and which also makes trucks more expensive and less useful.

I am aware that a truck has been invented in which a low platform was used, in combination with a revolving running-gear; but in the same the crane-neck consisted of one bifurcated bar or plate, which was, by a peculiar complicated device, connected with the front axle, and which is so expensive that it is altogether out of reach of that class of people who generally employ trucks.

A represents the main platform of the truck. The same rests upon the rear crank-axle, B, which is supported by the rear wheels, C, as shown.

If desired, springs may be interposed between the rear axle and the platform A.

D represents the front axle, supported by wheels E E, connected, by means of an ordinary fifth-wheel, F, and of a king-bolt, G, with a platform, H, as shown in Figs. 1 and 3. The platform H is but short, as is clearly shown in Fig. 2.

The front end of the platform A is connected with the platform H by means of two or more bent plates or bars, I I, which are bent so high that the front wheels can stand under them, and which hold the platforms A and H far enough apart to allow the front wheel to turn in between the same, as is clearly shown in Fig. 1.

The plates I have flanges $a\ a$, by means of which they are fastened upon or to the platform H, as shown in Fig. 3, and they have flanges $b\ b$, by means of which they are firmly fastened to the platform A, as is clearly shown in Fig. 4.

J is the driver's seat, which is secured upon the upper part of the crane-necks I, or to lugs $c$, projecting from the same, as shown.

K is a roller, upon which a chain or rope may be wound, to draw loads upon the wagon. The roller K has its bearings in the crane-necks I, as shown in Fig. 1.

I claim as new, and desire to secure by Letters Patent—

1. Connecting the front end of a truck-platform, A, with the platform H of the front running-gear by means of two or more crane-neck bars, I I, substantially as herein shown and described.

2. The front axle, D, fifth-wheel F, king-bolt G, and front platform, H, in combination with the crane-neck bars I, main truck-platform A, and rear axle, B, all made and operating substantially as herein shown and described.

3. The crane-neck bars I, when arranged as described, to connect the main truck-platform A with the platform H of the front running-gear, and when provided with flanges $a$ and $b$, by means of which it can be firmly secured to the respective platforms, as set forth.

WILLIAM P. F. BEGGS.

Witnesses:
JOHN BEGGS,
JAMES J. BEGGS.